(12) United States Patent
Fox

(10) Patent No.: US 7,264,569 B2
(45) Date of Patent: Sep. 4, 2007

(54) ELECTRONICALLY ACTUATED LOCKING DIFFERENTIAL

(75) Inventor: Matthew G. Fox, Ceresco, MI (US)

(73) Assignee: Eaton Corporation, Cleveland, OH (US)

( * ) Notice: Subject to any disclaimer, the term of this patent is extended or adjusted under 35 U.S.C. 154(b) by 167 days.

(21) Appl. No.: 11/035,832

(22) Filed: Jan. 14, 2005

(65) Prior Publication Data

US 2006/0160650 A1 Jul. 20, 2006

(51) Int. Cl.
*F16H 48/20* (2006.01)
(52) U.S. Cl. ..................... 475/241; 475/231
(58) Field of Classification Search ............. 475/231, 475/236, 237, 240, 241, 150
See application file for complete search history.

(56) References Cited

U.S. PATENT DOCUMENTS

| | | | |
|---|---|---|---|
| 5,007,886 A * | 4/1991 | Holmquist et al. | 475/231 |
| 5,591,098 A * | 1/1997 | Jones et al. | 475/231 |
| 6,083,134 A | 7/2000 | Godlew | |
| 6,537,172 B1 * | 3/2003 | McAuliffe et al. | 475/150 |
| 6,551,209 B2 | 4/2003 | Cheadle et al. | |

* cited by examiner

Primary Examiner—Saul Rodriguez
Assistant Examiner—Derek D. Knight
(74) Attorney, Agent, or Firm—Bradley J. Diedrich; L. J. Kasper

(57) ABSTRACT

A locking differential having a collar member (35) fixed to rotate with the gear case (11), but free to move axially, and cooperating with a first sidegear (19) to define interdigitated lock members (41,43) operable, when the collar member is locked (FIG. 1), to prevent rotation of the first sidegear relative to the gear case (11). A spring (61) is disposed between the collar member and the gear case, to bias the collar member toward unlocked (FIG. 3). A plurality of actuation members (47) is provided, each having a first end (49) in engagement with the collar member, and a second end (51) in engagement with a ramp plate (53). When the actuating means is in the actuated condition, the ramp plate rotates relative to the gear case, and the actuation members ramp-up on the ramp plate and move the collar member from unlocked to locked.

7 Claims, 5 Drawing Sheets

ELECTRONICALLY ACTUATED LOCKING DIFFERENTIAL

BACKGROUND OF THE DISCLOSURE

The present invention relates to traction modifying differential devices, and more particularly, to such devices of the type in which the differential gearing can be "locked" in response to an input signal, such as an electrical input signal.

Traction modifying locking differentials of the type to which the present invention relates typically include a gear case defining a gear chamber, and disposed therein, a differential gear set including at least one input pinion gear and a pair of output side gears. Typically, such a "locking differential" includes some sort of locking mechanism to prevent rotation of one of the side gears relative to the gear case, the engagement of the locking mechanism being initiated by some sort of actuator. By way of example only, the actuator could include a ball ramp mechanism in which rotation of a ramp plate is retarded relative to the gear case, thus initiating ramping, in response to a signal being transmitted to an electromagnetic coil disposed adjacent the ramp plate. Examples of locking differentials of the type described hereinabove are shown in U.S. Pat. Nos. 6,083,134 and 6,551,209, both of which are assigned to the assignee of the present invention and incorporated herein by reference.

In both of the locking differentials illustrated and described in the above-incorporated patents, transmitting an appropriate input signal to the electromagnetic coil results in a locking member engaging a mating portion associated with the differential side gear disposed immediately adjacent the actuator arrangement (which includes the electromagnetic coil). Although electrically actuated locking differentials made in accordance with the teachings of the above-incorporated patents are now in commercial production, and are performing in a satisfactory manner, the design configuration illustrated and described in the above-incorporated patents has one inherent characteristic which can limit the performance capability of the locking differential. With the actuator utilizing a conventional ball-ramp device (i.e., one having two ramp plates with a set of cam balls being disposed therebetween), a substantial amount of packaging space, both radially and axially, is taken up just by the ball ramp device. Furthermore, ball ramp devices inherently have a relatively small axial displacement, as the device "ramps up", and that can represent a disadvantage in a locking differential, as will be described subsequently.

As should be understood by those skilled in the art, the torque capacity of the locking mechanism in a locking differential is a function of (and is generally proportional to) the axial travel of the locking mechanism, as it moves between the locked and unlocked conditions. Furthermore, the travel of the locking mechanism is, in the devices of the above-incorporated patents, limited by the axial travel of the ball ramp device, i.e., by the axial travel of the "inner ramp plate" disposed adjacent the differential case. It has now also become understood that in the devices of the above-incorporated patents, the travel of the locking mechanism, and therefore, the torque capacity of the locking mechanism is further limited by the arrangement wherein the locking mechanism is associated with the side gear adjacent the actuator (the electromagnetic coil and ball ramp device), such that there is within the "package" a limited amount of space for the locking mechanism to achieve its "travel". By way of example only, in a commercial embodiment of a locking differential made in accordance with the teachings of above-incorporated U.S. Pat. No. 6,551,209, the locking members have an axial travel of only about 4 mm., and therefore, an effective "locking engagement" of only about 3 mm.

Also, as is known by those skilled in the art, the travel of the locking mechanism (in moving from the unlocked to the locked condition) must be matched by a biasing spring arrangement capable of moving the locking mechanism over a distance equal to the "travel", but oppositely, from the locked condition to the unlocked condition. The requirement for a biasing spring arrangement which is able to move the locking mechanism a distance equal to the required "travel" of the locking mechanism makes it much more difficult to package the locking mechanism, especially in the case of those devices in which the locking mechanism is on the end of the device immediately adjacent the actuator.

BRIEF SUMMARY OF THE INVENTION

Accordingly, it is an object of the present invention to provide an improved locking differential, of the type in which locking is initiated by an input signal, in which the locking differential overcomes the above-described problems associated with the known prior art.

It is a more specific object of the present invention to provide such an improved locking differential which accomplishes the above-stated object by providing a locking mechanism having substantially greater travel than in the prior art locking differentials.

It is a related object of the present invention to provide such an improved locking differential which utilizes, more effectively than in the prior art, the available space in the differential to accommodate both the locking mechanism and the actuator mechanism.

The above and other objects of the invention are accomplished by the provision of a differential gear mechanism of the type including a gear case defining an axis of rotation and a gear chamber. Differential gear means are disposed in the gear chamber including at least one input gear and first and second output gears. A means operable to prevent rotation of the first output gear relative to the gear case is included, and actuating means for actuating the rotation prevention means in response to an input signal. The actuating means comprises a ramp plate disposed about a portion of the gear case adjacent the second output gear, and somewhat radially outward therefrom, the ramp plate being disposed, in an unactuated condition of the actuating means, to rotate with the gear case. The actuating means further includes an actuator operable when the actuating means is in an actuated condition, to cause the ramp plate to rotate at a speed of rotation different than that of the gear case.

The improved differential gear mechanism is characterized by a collar member fixed to rotate with the gear case but free to move axially relative to the gear case, and cooperating with the first output gear to define lock members operable, when the collar member is in a locked position, to prevent rotation of the first output gear relative to the gear case. A biasing means is disposed axially between the collar member and the gear case, tending to bias the collar member from the locked position, in a direction toward the second output gear, to an unlocked position. A plurality of elongated actuation members is provided, each having a first end in engagement with the collar member, and a second end in engagement with the ramp plate. When the actuating means is in the actuated condition, and the ramp plate rotates relative to the gear case, the elongated actuation members ramp-up on the ramp plate and move in an axial direction toward the first output gear, moving the collar member from the unlocked position to the locked position, in opposition to the force of the biasing means.

DETAILED DESCRIPTION OF THE PREFERRED EMBODIMENT

Figure 1:
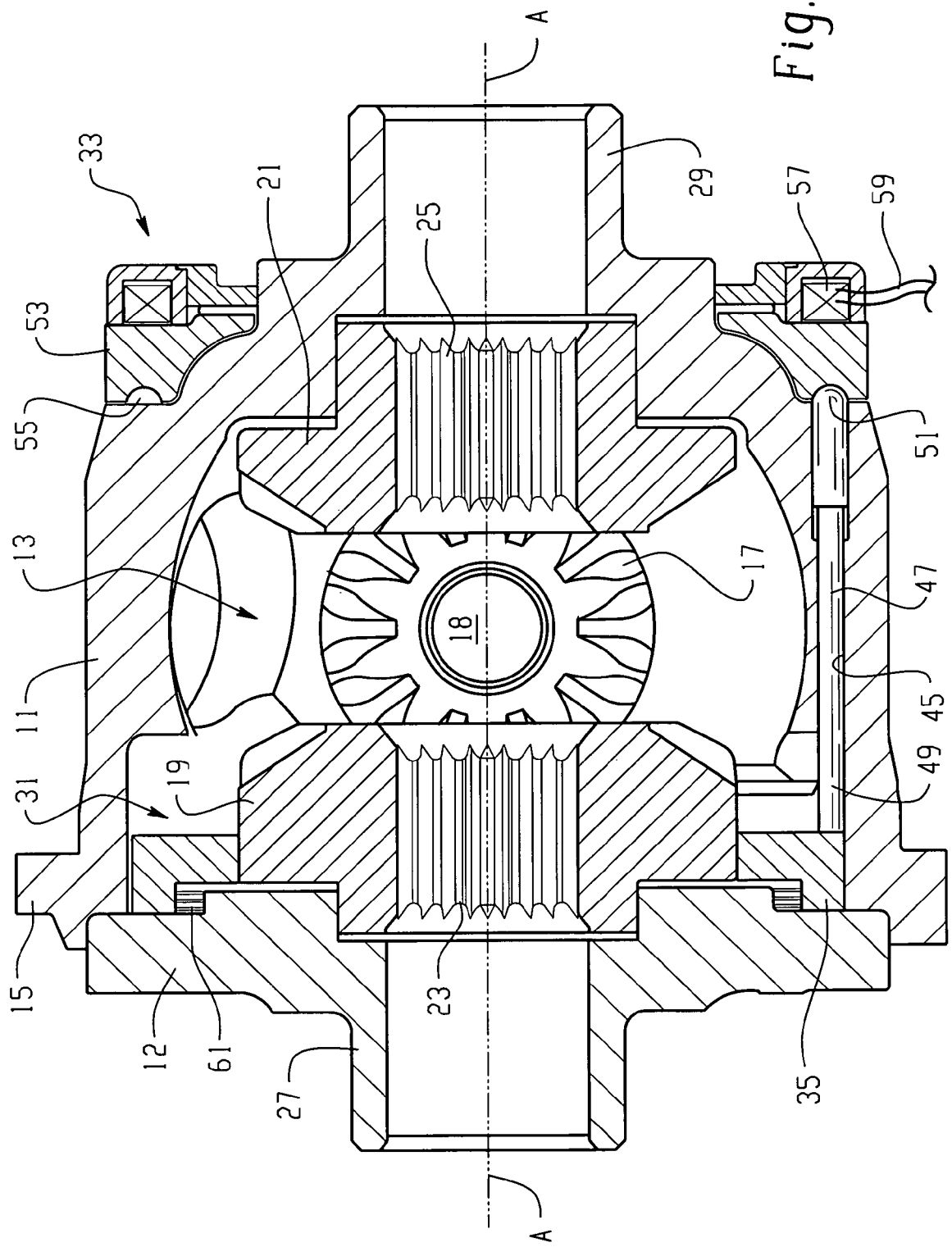
FIG. 1 is an axial cross-section of a locking differential made in accordance with the teachings of the present invention, in its actuated, locked condition.

Referring now to the drawings, which are not intended to limit the invention, FIG. 1 is an axial cross-section of a locking differential including the present invention. The construction and operation of locking differentials of the general type illustrated in FIG. 1 may be better understood by reference to the above-incorporated patents.

The locking differential shown in FIG. 1 includes a gear case 11 and an end cap 12, which may be attached to the gear case 11 by any suitable means, such as a plurality of bolts (not shown herein). The gear case 11 and the end cap 12 cooperate to define a gear chamber, generally designated 13. Torque input to the locking differential is typically by means of an input ring gear (also not shown herein) which may be attached to a flange 15 (shown only fragmentarily in FIG. 1, but more fully in FIGS. 3 and 4).

Disposed within the gear chamber 13 is a differential gear set including a pair of input pinion gears 17 (only one of which is shown in FIG. 1). As is typical, the input pinion gears 17 are mounted rotatably about a pinion shaft 18, the pinion shaft 18 being secured relative to the gear case 11 by any suitable means (not shown herein). The pinion gears 17 comprise the input gears of the differential gear set, and are in meshing engagement with a pair of side gears 19 and 21. As is conventional in the differential art, the side gears 19 and 21 define sets of internal, straight splines 23 and 25, respectively, which are adapted to be in splined engagement with mating external splines on a pair of axle shafts (not shown). The gear case 11 defines annular hub portions 27 and 29, on which may be mounted a pair of bearing sets (not shown herein) which are used to provide rotational support for the rotating differential device relative to an outer differential housing or "carrier" (also not shown herein).

As is well known to those skilled in the art, during normal, straight ahead operation of the vehicle, no differentiation occurs between the left and right axle shafts, or between the left and right side gears 19 and 21, and therefore, the pinion gears 17 do not rotate relative to the pinion shaft 18. As a result, the gear case 11, the pinion gears 17, and the side gears 19 and 21 all rotate about an axis of rotation A, as if comprising a solid unit.

It should be understood that the locking differential of the present invention may be controlled in either of a pair of modes. The differential may be controlled manually, i.e., wherein the driver manually selects the locked mode (rather than the unlocked mode), such that the differential operates in the locked mode almost immediately after the vehicle begins to move. Alternately, the locking differential may be allowed to operate in an automatic mode wherein, by way of example only, the vehicle microprocessor senses an operational condition, such as an incipient wheel slip, and transmits an appropriate electrical signal to the locking differential, locking the side gear 19 relative to the gear case 11, to prevent any further differentiation therebetween.

In the case of automatic actuation of the locking differential, it will be understood that, under certain operation conditions, such as when the vehicle is turning, or a slight difference in tire size exists, it is permissible for a certain amount of differentiating action to occur between the side gears 19 and 21. However, in accordance with one important aspect of the invention, the locking differential of FIG. 1 does not include any clutch pack or any other mechanism which merely retards or limits differentiating action, but instead, operates in either an unactuated, unlocked mode (effectively acts like an "open differential"), or operates in an actuated, locked mode.

Figure 2:
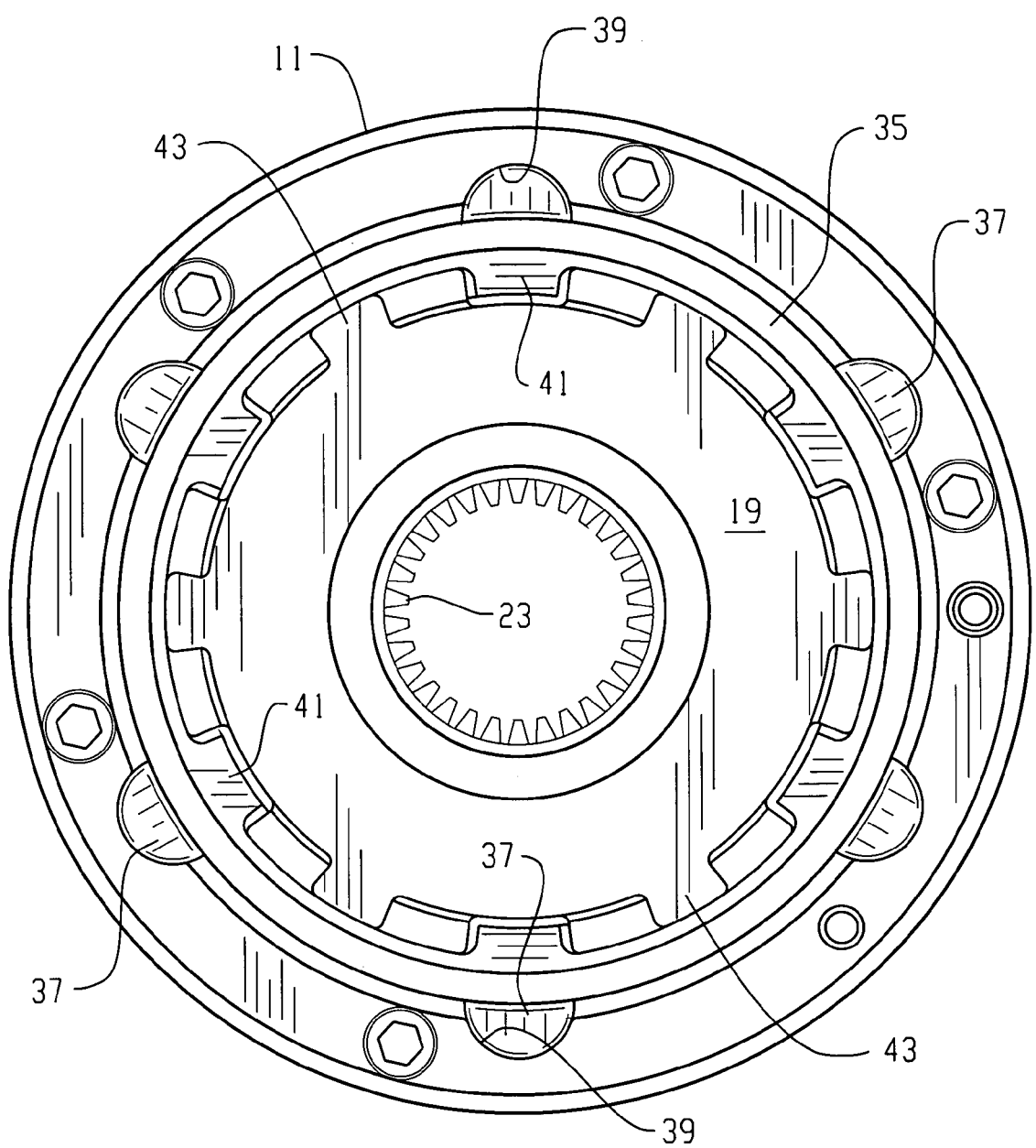
FIG. 2 is an end view, taken from the left in FIG. 1, but with the end cap removed to enable viewing of one important aspect of the invention.

Referring now primarily to FIG. 1, in conjunction with FIG. 2, the locking differential of the present invention includes a rotation prevention mechanism, generally designated 31 (the reference numeral "31" appearing only in FIGS. 1, 3 and 4), which is disposed entirely within the gear case 11 and is operably associated with the side gear 19 ("first output gear"). The locking differential also includes an actuation mechanism (or "actuator"), generally designated 33, which is disposed primarily external to the gear case 11 as will be described in greater detail subsequently.

Figure 3:
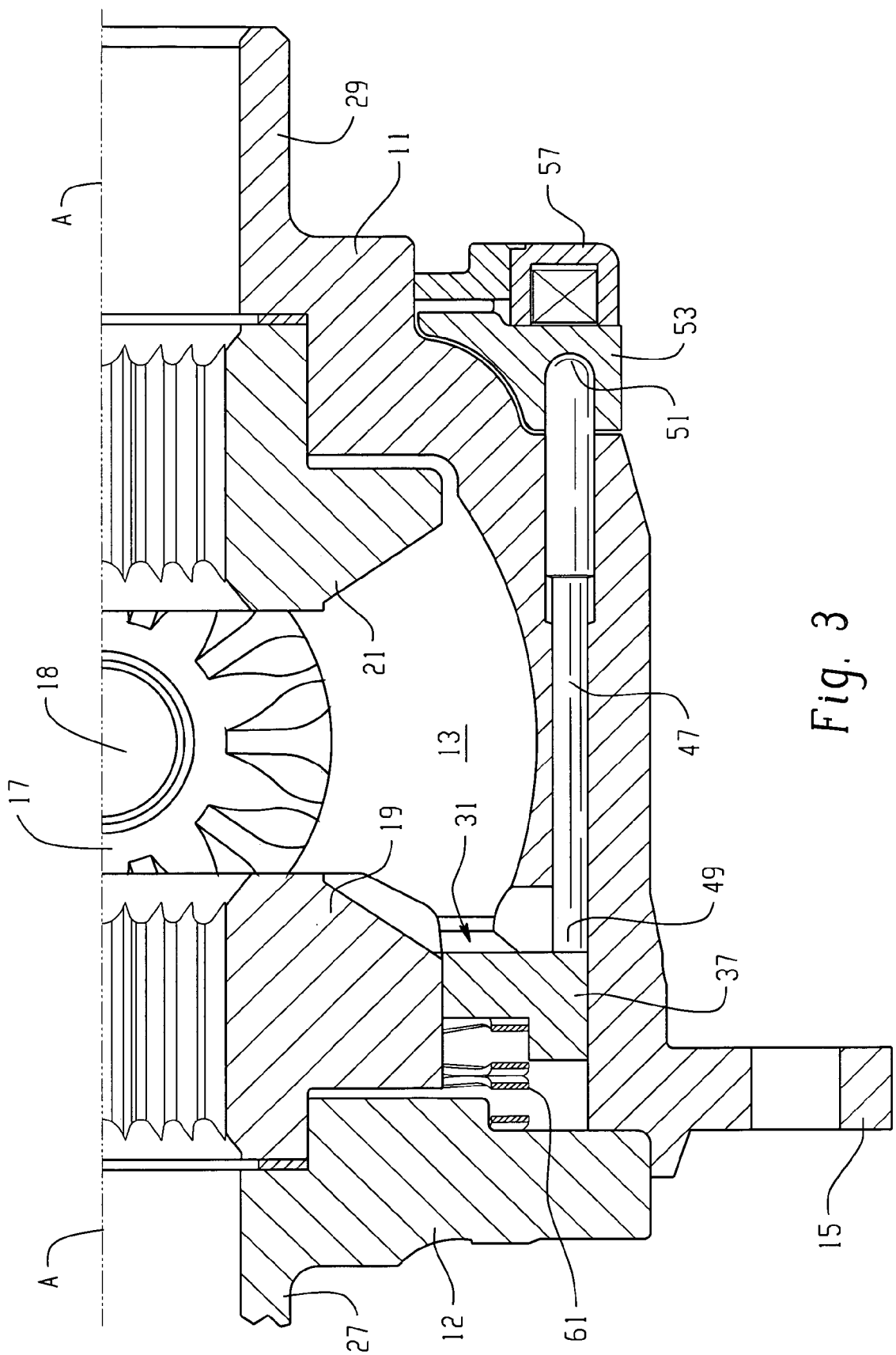
FIG. 3 is an enlarged, fragmentary axial cross-section of the locking differential shown in FIG. 1, but in its unactuated, unlocked condition.
Figure 4:
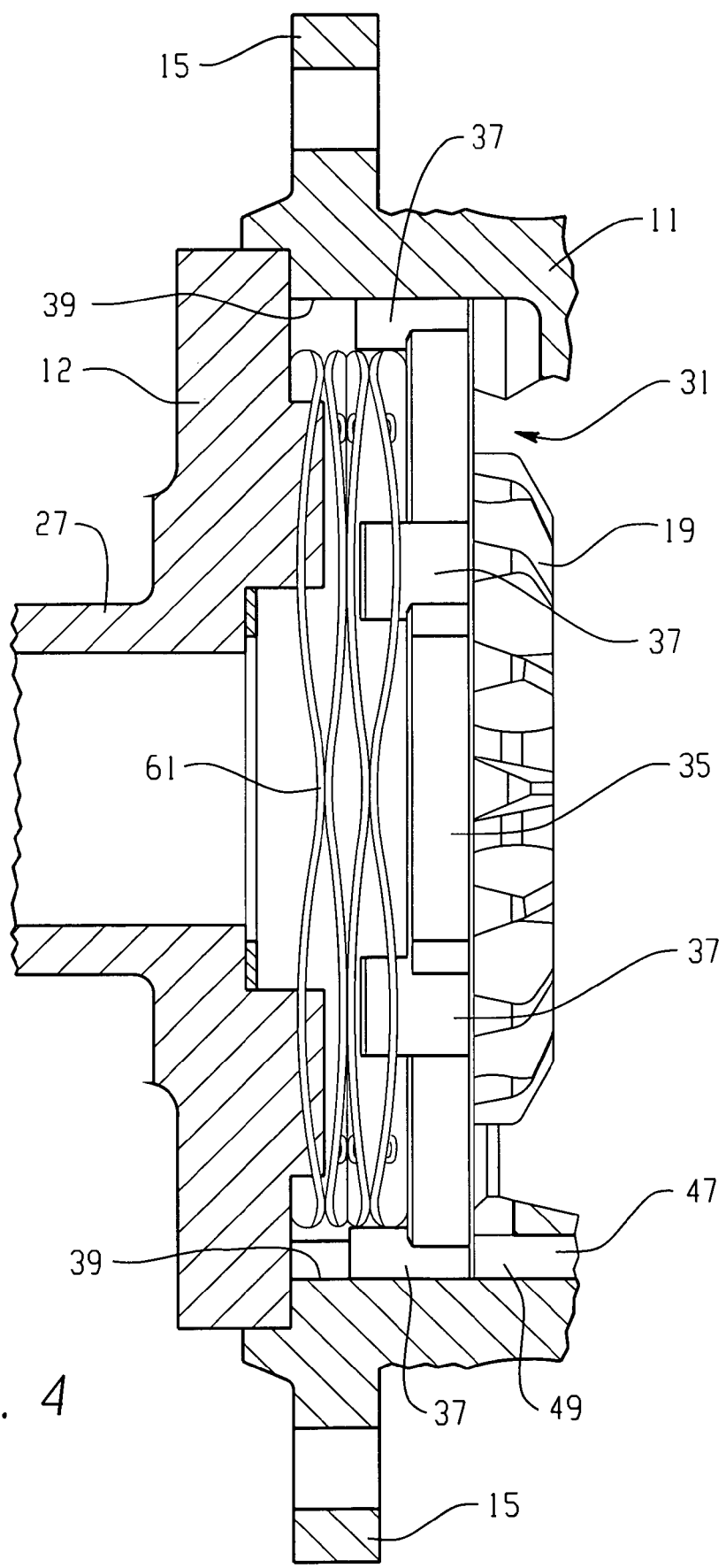
FIG. 4 is a fragmentary view, similar to FIGS. 1 and 3, but showing in plan view, rather than axial cross-section, the biasing spring arrangement which comprises an important aspect of the present invention.

Referring still primarily to FIGS. 1 and 2, the rotation prevention mechanism 31 comprises a generally annular collar member 35 which includes, about its outer periphery, a plurality of ears 37, best shown in FIGS. 2 and 4. In the subject embodiment, and by way of example only, there are provided six of the ears 37. Each of the ears 37 is received within a mating, axially-extending recess 39 defined by the gear case 11, such that the collar member 35 is prevented from rotating relative to the gear case 11, but is permitted to move axially between the locked position shown in FIG. 1 and an unlocked position shown in FIGS. 3, 4 and 5.

Figure 5:
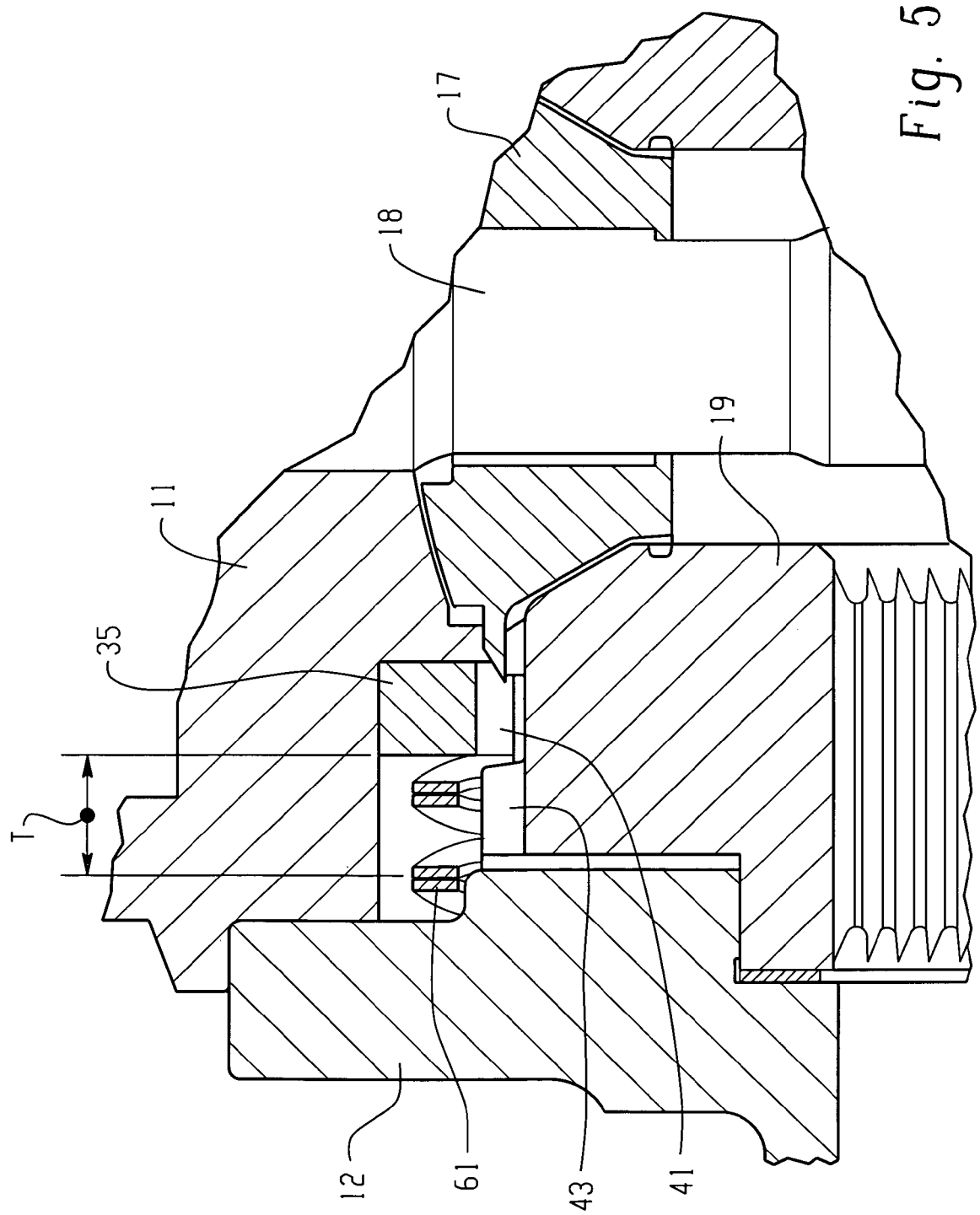
FIG. 5 is a further enlarged, fragmentary, axial cross-section, showing the locking differential of the present invention in its unactuated, unlocked condition, and illustrating the "travel" of the locking mechanism.

Disposed about an inner periphery of the collar member 35 is a plurality of lock members 41, and interdigitated therewith is a plurality of lock members 43, disposed about an outer periphery of the side gear 19, one of each of the lock members 41 and 43 being shown in FIG. 5. As may best be seen in FIG. 2, but by way of example only, there are six of the lock members 41 and six of the lock members 43. Each adjacent pair of lock members defines therebetween a circumferential gap which is substantially greater than the circumferential width of the interdigitated lock member disposed within that gap, as may best be seen in FIG. 1. Such an arrangement is preferred to facilitate movement of the collar member 35 from its unlocked position (shown in FIGS. 3, 4 and 5) to its locked position (as shown in FIGS. 1 and 2).

It is believed to be within the ability of those skilled in the art to select the appropriate configuration of the lock members 41 and 43, as well as the circumferential "gap" therebetween, to provide a locking mechanism with sufficient strength (locking torque), but which still retains the ability to lock "on-the-move". Therefore, it will be understood that FIGS. 1 and 2 represents the "locked" condition of the rotation prevention mechanism 31, although, in actual use, the lock members 41 and 43 would not be "centered" relative to each other, but instead, each lock member 41 would be in face-to-face engagement with an adjacent lock member 43.

Referring again primarily to FIG. 1, but in conjunction with FIG. 3, the gear case 11 defines a plurality of cylindrical openings 45, and slidably disposed within each opening 45 is an elongated, generally cylindrical actuation member 47. In the subject embodiment, and by way of example only, there are three of the actuation members 47. Each actuation member 47 has a first end 49 in engagement with the collar member 35, and a second end 51 extending somewhat out of the gear case 11. Although not essential to the present invention it is preferred that each of the ends 51 is configured to be somewhat hemi-spherical, for reasons which will become apparent subsequently. In the subject embodiment, but by way of example only, the three actuation members 47 engage the ears 37 which are at the 2 o'clock, 6 o'clock, and 10 o'clock positions in FIG. 2. It should be apparent that the actuation member 47 shown in FIG. 3 is the actuation member 47 which would be in engagement with the ear 37 which is shown at the 6 o'clock position in FIG. 2.

Referring still primarily to FIGS. 1 and 3, disposed about the gear case 11 at the end adjacent the side gear 21 is the actuator 33 which includes a single ramp plate 53 which defines a plurality of ramp surfaces 55, there being one ramp surface 55 for each actuation member 47. As was mentioned in the background of the disclosure, a conventional ball-ramp mechanism having two ramp plates, and one set of balls therebetween, typically provides relatively little axial travel. However, and in accordance with one aspect of the present invention, the use of what may be referred to as a "pin-and-ramp" device, having one ramp plate and one set of "pins" (i.e., the actuation members 47) provides for a much greater axial travel of the actuation members 47 than would be provided by a conventional ball-ramp actuator, in which the "inner" ramp plate is the member which has the "travel". It may now be understood why the second ends 51 of the actuation members 47 are formed to be hemi-spherical, as the ends 51 ride on the ramp surfaces 55.

The actuator 33 further includes an electromagnetic coil, generally designated 57, the function of which is to exert the required retarding torque on the ramp plate 53, thus initiating ramp-up of the actuation members 47. As used herein, the term "ramp-up" in regard to the actuation members 47 will be understood to mean and include moving the members 47 from the fully retracted position shown in FIGS. 3 and 4, wherein the coil 57 is not energized (corresponding to the unactuated, unlocked condition), to the fully extended position shown in FIG. 1, when the coil 57 is energized (corresponding to the actuated, locked condition). The collar member 35 is biased toward the unactuated, unlocked condition by means of a wave spring 61, shown in cross-section in FIG. 3, but in external plan view in FIG. 4. Although, within the scope of the present invention, a number of different biasing arrangements could be utilized, the wave spring 61 facilitates a compact packaging of the rotation prevention mechanism 31. As shown somewhat schematically in FIG. 1, the electromagnetic coil 57 is energized by means of a pair of electrical leads 59, the reference numeral "59" also being used hereinafter to identify an electrical input signal to the actuator 33.

As was mentioned in the Background of the Disclosure, the conventional ball-ramp device is somewhat limited in its ability to provide the desired "travel" for the locking mechanism (actuation members 47 and collar member 35). As was also mentioned, a prior art locking differential made in accordance with above-incorporated U.S. Pat. No. 6,551,209 provides a locking mechanism travel of only 4 mm., having a locking engagement of only 3 mm. However, in a locking differential made in accordance with the present invention, and as is best illustrated in FIG. 5, the travel "T" of the collar member 35, in moving between the locked (FIG. 1) and unlocked (FIGS. 3, 4 and 5) conditions is about 9 mm, by way of example only. As a result, the "locking engagement" (i.e., the axial length of the engagement) between the lock members 41 and 43 is about 8 mm., or more than double that in a prior art device of approximately the same overall, physical size. Depending upon the overall physical size of the differential utilizing the present invention, the travel "T" (which is approximately equal to the ramp-up of the actuation members 47) could be anywhere in a range of about 8 mm. to about 12 mm., by way of example only.

In accordance with one important aspect of the invention, and as may be seen by viewing FIGS. 1 and 3, the locking differential of the invention is not much larger (in terms of the outside dimensions of the gear case 11 and end cap 12) than would be an open differential utilizing pinion gears and side gears of approximately the same size and torque capacity. Such an improved package is possible, in accordance with the present invention, because of locating the rotation prevention mechanism 31 adjacent (surrounding) the first side gear 19, and locating the actuator 33 about a portion of the gear case 11 adjacent the second side gear 21, and somewhat radially outward therefrom.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A differential gear mechanism of the type including a gear case defining axis of rotation and a gear chamber; differential gear means disposed in said gear chamber including at least one input gear and first and second output gears; means operable to prevent rotation of said first output gear relative to said gear case; actuating means for actuating said rotation prevention means in response to an input signal; said actuating means comprising a ramp plate disposed about a portion of said gear case adjacent said second output gear, and somewhat radially outward therefrom, said ramp plate being disposed, in an unactuated condition of said actuating means, to rotate with said gear case, said actuating means further including an actuator operable when said actuating means is in an actuated condition, to cause said ramp plate to rotate at a speed of rotation different than that of said gear case; characterized by:

(a) a collar member fixed to rotate with said gear case, but free to move axially relative to said gear case, and cooperating with said first output gear to define lock members operable, when said collar member is in a locked position, to prevent rotation of said first output gear relative to said gear case;

(b) biasing means disposed axially between said collar member and said gear case, tending to bias said collar member, from said locked position, in a direction toward said second output gear, to an unlocked position; and (c) a plurality of elongated actuation members, each having a first end in engagement with said collar member, and a second end in engagement with said ramp plate whereby, when said actuating means is in said actuated condition, and said ramp plate rotates relative to said gear case, said elongated actuation members ramp-up on said ramp plate and move in an axial direction toward said first output gear, moving said collar member from said unlocked position to said locked position, in opposition to the force of said biasing means.

2. A differential gear mechanism as claimed in claim 1, characterized by said collar member being generally annular, and surrounding an outer cylindrical surface of a portion of said first output gear.

3. A differential gear mechanism as claimed in claim 2, characterized by an inner surface of said collar member defining a first plurality of said lock members, and said outer cylindrical surface of said first output gear defining a second plurality of said lock members, and, said first and second lock members being interdigitated.

4. A differential gear mechanism as claimed in claim 1, characterized by said lock members having an axial dimension of approximately T, whereby said collar member moves an axial distance of about T, as said collar member moves between said locked position and said unlocked position.

5. A differential gear mechanism as claimed in claim 4, characterized by said ramp plate defining a plurality of ramp surfaces, one for each of said plurality of elongated actuation members, each of said ramp surfaces having a ramp rise approximately equal to said axial dimension T, wherein said dimension T is in the range of about 8 mm. to about 12 mm.

6. A differential gear mechanism as claimed in claim 1, characterized by said actuator comprising an electromagnetic coil and said input signal comprises an electric signal.

7. A diferential gear mechanism as claimed in claim 4, characterized by said ramp plate defining a plurality of ramp surfaces, one for each of said plurality of elongated actuation members, each of said ramp surfaces having a ramp rise approximately equal to said axial dimension T.

* * * * *